United States Patent
Bates et al.

(10) Patent No.: US 6,480,207 B1
(45) Date of Patent: Nov. 12, 2002

(54) METHOD, APPARATUS AND COMPUTER PROGRAM PRODUCT FOR IMPLEMENTING GRAPHICAL USER INTERFACE (GUI) WINDOW CONTROL

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/385,807

(22) Filed: Aug. 30, 1999

(51) Int. Cl.[7] .................................. G06F 3/14
(52) U.S. Cl. ................. 345/800; 345/781; 345/788; 345/756; 345/762; 345/763; 345/769
(58) Field of Search ................. 345/781, 800, 345/788, 856, 862, 863, 769

(56) References Cited

U.S. PATENT DOCUMENTS 6,011,511 A * 1/2000 Chuong et al. ............. 342/359
6,091,395 A * 7/2000 DeStefano ................... 345/788
6,396,478 B1 * 5/2002 Kravtin et al. ............ 248/118.1

* cited by examiner

Primary Examiner—Kristine Kincaid
Assistant Examiner—Thomas T. Nguyen
(74) Attorney, Agent, or Firm—Joan Pennington (57) ABSTRACT

A method, apparatus, and computer program product are provided for implementing graphical user interface (GUI) window control. At least one window portion of a window object is defined for selection. Checking for a predefined path selection of one window portion is performed. Responsive to identifying the predefined path selection, checking for a user selection entry within a set time period is performed. Responsive to an identified user selection entry, the window portion is easily selected so that the portion can be dragged and the window object resized.

8 Claims, 7 Drawing Sheets

METHOD, APPARATUS AND COMPUTER PROGRAM PRODUCT FOR IMPLEMENTING GRAPHICAL USER INTERFACE (GUI) WINDOW CONTROL

FIELD OF THE INVENTION

The present invention relates generally to the data processing field, and more particularly, relates to a method, apparatus and computer program product for implementing graphical user interface (GUI) window control.

DESCRIPTION OF THE RELATED ART

When sizing a window, it is labor intensive to put the mouse pointer on the window border or corner, when you want to get the double arrow icon to appear for window resize. This is especially difficult if you have a shaky hand, a fast pointer speed, or a narrow border. The pointer may overshoot the border on several tries, and then when you do get it on the border, a tiny jiggle of the mouse can send it off the border before you can hit the left button to grab the border and drag it. The problem is worse if, when you overshoot the border, your operating system brings a new window to the foreground automatically, because then you lose the view of the border and have to go bring its window back into view.

A mechanism is needed to easily and efficiently implement graphical user interface (GUI) window control. A need exists for a way to easily resize windows.

SUMMARY OF THE INVENTION

Principal objects of the present invention are to provide a method, apparatus, and computer program product for implementing graphical user interface (GUI) window control. Other important objects of the present invention are to provide such method, apparatus and computer program product for implementing graphical user interface (GUI) window control substantially without negative effect and that overcome many of the disadvantages of prior art arrangements.

In brief, a method, apparatus, and computer program product are provided for implementing graphical user interface (GUI) window control. At least one window portion of a window object is defined for selection. Checking for a predefined path selection of one window portion is performed. Responsive to identifying a predefined path selection, checking for a user selection entry within a set time period is performed. Responsive to an identified user selection entry, the window portion is easily selected so that the portion can be dragged and the window object resized.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
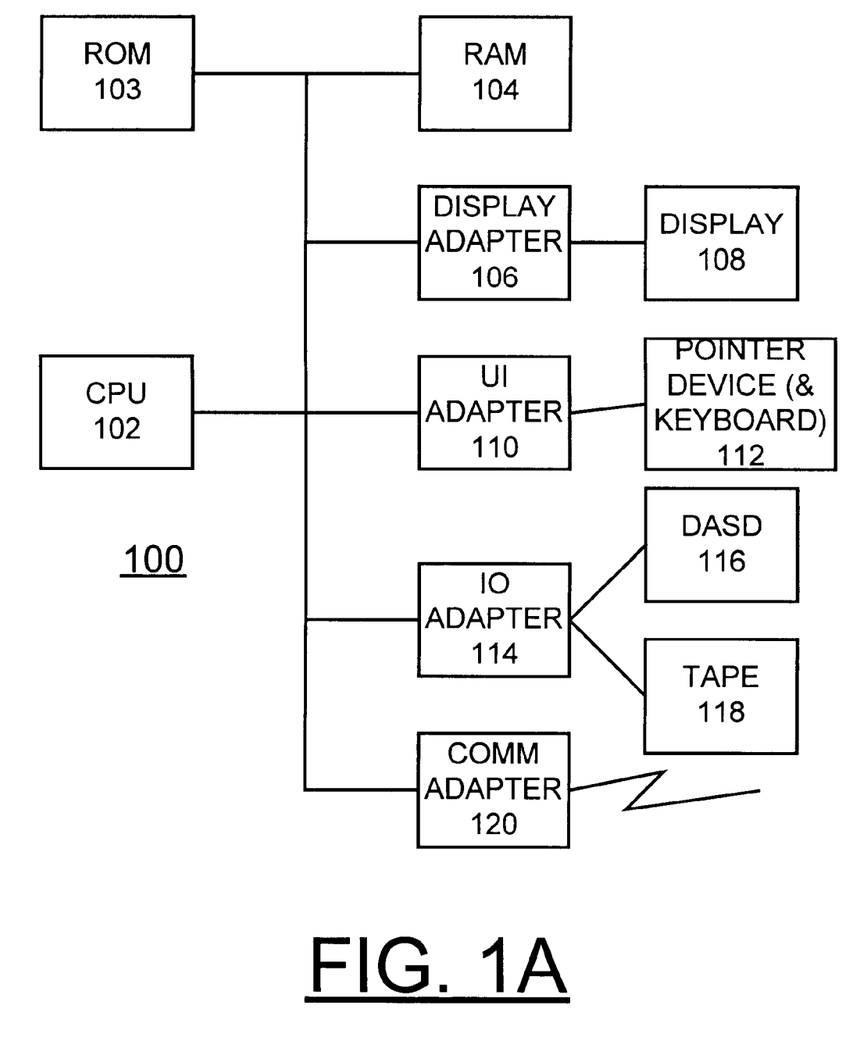
FIGS. 1A and 1B are block diagram representations illustrating a computer system and operating system for implementing a method and computer program product for graphical user interface (GUI) window control in accordance with the invention.
Figure 1B:
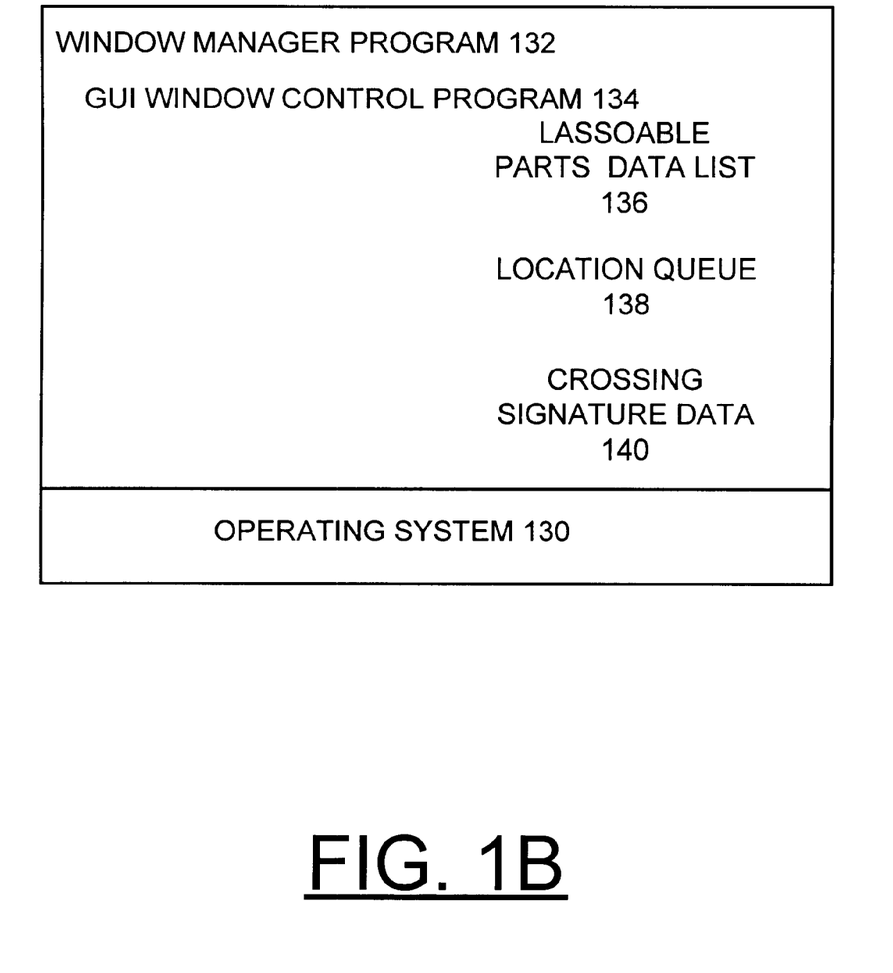

Having reference now to the drawings, in FIGS. 1A and 1B, there is shown a computer or data processing system generally designated by the reference character 100 for carrying out the method of the preferred embodiment. As shown in FIG. 1A, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130, a window manager program 132 and a graphical user interface (GUI) window control program 134 of the preferred embodiment. Lassoable parts data list 136, a location queue 138 and crossing signature data 140 are stored for window control of the preferred embodiment. The lassoable parts data list 136 is a list of window border and other parts that are selectable by lassoing. The location queue 138 is a queue of mouse locations that is used to save the last N locations, where N is the number of mouse movements that can happen in a defined maximum allowable time for a lasso to occur. Older events or positions fall off the end and are gone. Only the most recent events or positions are in the location queue 138. The crossing signature data 140 is used to identify parts of selectable objects that are crossed by mouse movements and the order in which parts of selectable objects are crossed.

Various commercially available computers can be used for computer system 100, for example, an IBM personal computer. CPU 102 is suitably programmed by the GUI window control program 134 to generate display screens, for example as shown in FIGS. 2A, 2B, 2C, and 2D to receive user selections, and to execute the flowcharts of FIGS. 3 and 4.

In accordance with features of methods of the preferred embodiment, GUI window control program 134 provides a new selection technique for easily resizing windows in computer system 100. With a mouse or other pointer device 112, a predefined window portion, such as predefined window border parts, is selected or lassoed in a quick movement. The mouse 112 selects the window border when the mouse pointer is moved around the selectable border portion, such as a corner of a window, within a time window. Circling a corner in a quick motion, as in lassoing a pole, using methods of the preferred embodiment is much easier than carefully positioning the mouse exactly onto the corner as in known windows. The new selection techniques of the preferred embodiment add additional ways to select and do not preempt traditional selection.

Figure 2A:
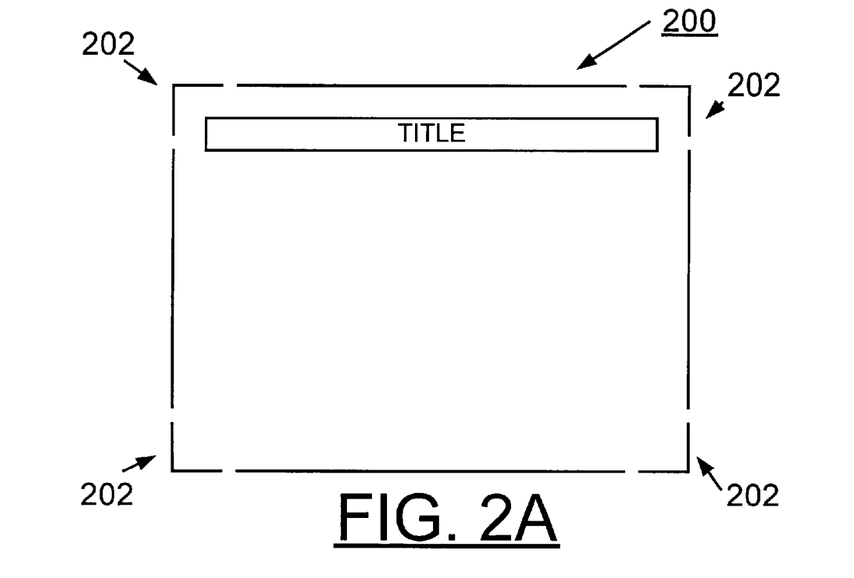
FIGS. 2A, 2B, 2C, and 2D are exemplary screen displays illustrating graphical user interface (GUI) window control in accordance with the preferred embodiment.
Figure 2B:
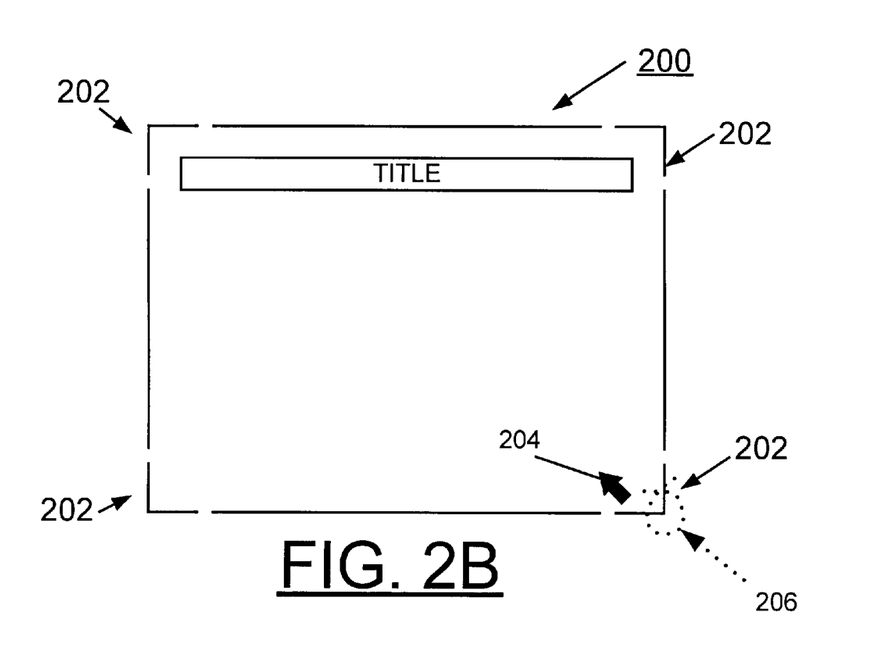
Figure 2C:
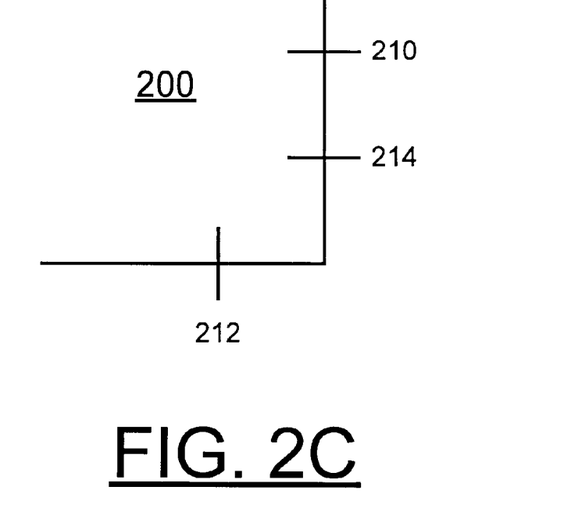
Figure 2D:
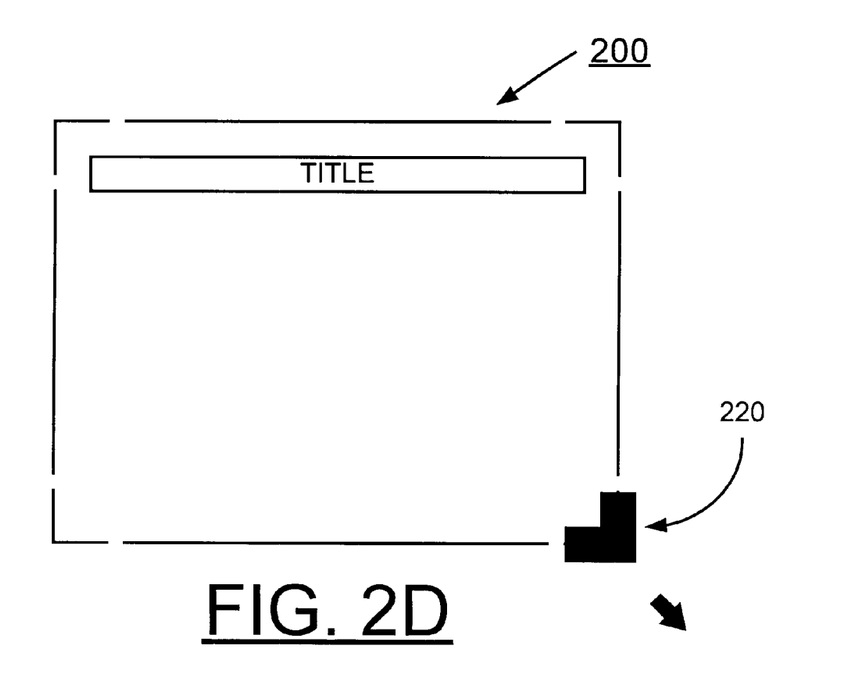

Referring now to FIGS. 2A, 2B, 2C, and 2D, there are shown illustrative screen displays or windows generally designated by the reference character 200 to receive user window control selections in accordance with the preferred embodiment. A plurality of predefined example window portions 202 within the window 200 are shown. In FIG. 2B, a cursor arrow 204 is moved around one window portion 202 in a path represented by a dotted line designated by 206. For example, as illustrated in FIG. 2B, for the window control selection, the mouse 112 moves cursor arrow 204 over the border, comes back across the border, then moves over the border again as shown by dotted line 206 within a set time period. This path 206 may be considered equivalent to throwing a rope around the border in a half hitch knot or to drawing the cursive letter "e" or "o" straddled over the border within window portion 202. This technique would be most useful for selecting a window corner (to get the double arrow icon at a 45 degree angle). In the corner case of window portion 202, such as defined by window locations 210, 212, and 214 in FIG. 2C, the mouse crossings include crossing over and back and over two borders that touch at a corner window portion 202. FIG. 2D illustrates a selected window portion 220 which is displayed as a result of selecting this corner by the lassoing operation. Once selected, this corner can now be dragged to resize the window.

User selected options are defined for the lasso function including a range adjustment, a direction adjustment and a path. For example, with range adjustment, if a border is lassoed with a diameter greater or less than a threshold, the mouse does not latch onto the border. With direction adjustment, a top or bottom first is specified first. Such as, a top first circle is over, than under, then over. Alternatively, a bottom first circle is under, then over, then under. The path adjustment allows a zigzag or scribble option. Instead of circular crossings, zigzag crossings are allowed in multiple configurations. For example, zig-zag-zig top to bottom, zig-zag-zig-zag bottom to top, or zigzag any order N times (scribble) within a time window.

It should be understood that the lassoing techniques of the preferred embodiment can be used to select other objects besides window borders and corners. For example, when editing with an HTML editor, an icon can be selected using the lasso function of the preferred embodiment. This is a simple operation passing the mouse through the icon quickly back and through in a circular motion to select it.

Figure 3:
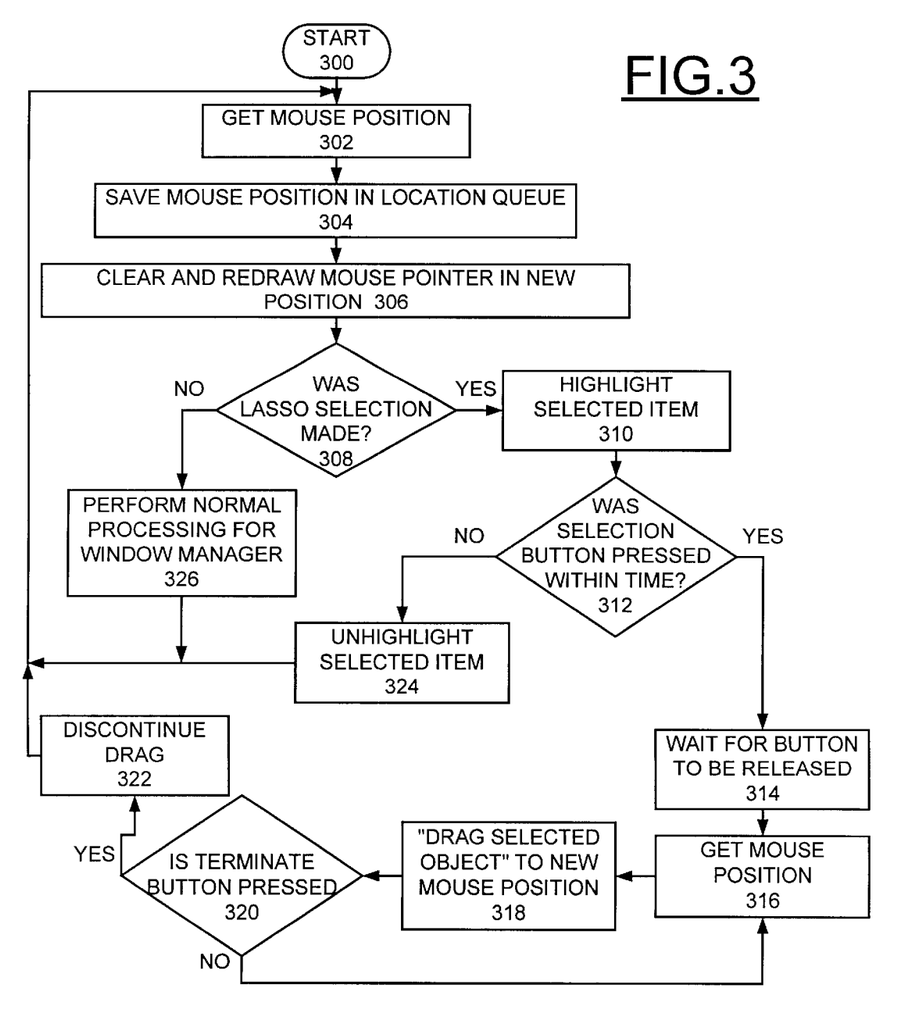
FIGS. 3 and 4 are illustrative flow charts of steps for implementing graphical user interface (GUI) window control in accordance with the preferred embodiment.
Figure 4:
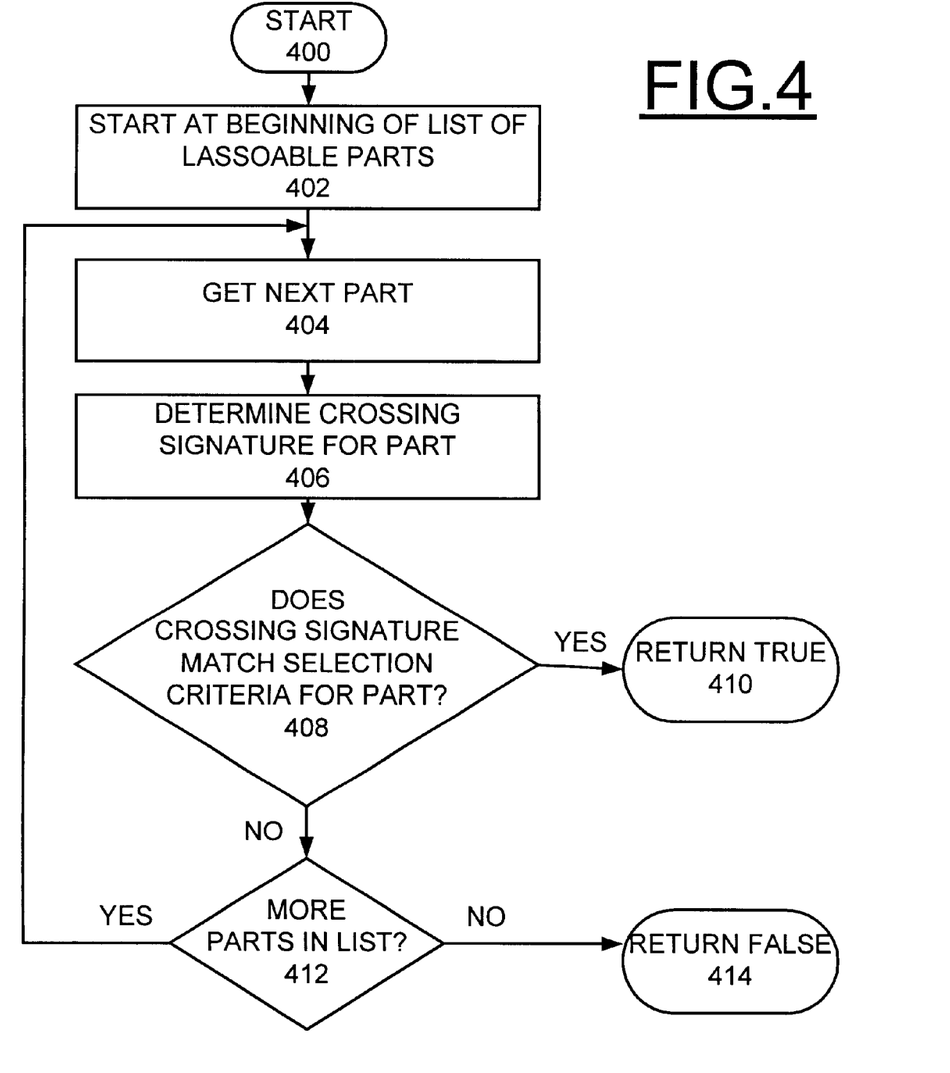

Referring now to FIGS. 3 and 4, there are shown flow charts of exemplary steps for implementing graphical user interface (GUI) window control in accordance with the preferred embodiment. In FIG. 3, a main flow sequence of the GUI window control program 134 of the preferred embodiment is shown starting at a block 300. A mouse position is obtained at a block 302. The mouse position is saved in the location queue 138 as indicated in block 304. The mouse pointer 204 is cleared and redrawn in the new location as indicated in block 306. Checking whether a lasso or predefined path selection was made is performed as indicated in a decision block 308. When a lasso or pre-defined path selection is identified at decision block 308, then the selected item is highlighted at block 310, such as window portion 220 in FIG. 2D.

Checking whether the selected button was pressed within a set time period is performed as indicated in a decision block 312. When the selected button was pressed within the set time period, then waiting for the selected button to be released is performed as indicated in block 314. Then the mouse position is obtained as indicated in block 316. Next the selected item is dragged to the new mouse position as indicated in block 318, for example, to increase or decrease the window size. Checking for the terminate button being pressed is performed as indicated in a decision block 320. When the terminate button being pressed is identified, then the drag is discontinued as indicated in block 322. Then the sequential operations return to block 302 to get a mouse position.

When determined at decision block 312 that the selected button was not pressed within the set time period, then the selected item is unhighlighted as indicated in block 324. Then the sequential operations return to block 302 to get a mouse position. When a lasso selection is not identified at decision block 308, then normal processing for the window manager 132 is performed as indicated in block 326.

Referring to FIG. 4, there are shown exemplary steps performed at block 308 in FIG. 3 to determine whether a lasso selection was made starting at block 400. The sequence starts at the beginning of the lassoable parts list 136 as indicated in block 402. A next part is obtained as indicated in block 404. The crossings signature for the part is determined as indicated in block 406. Checking whether the crossings signature matches the selection criteria for the part is performed as indicated in a decision block 408. When a match is identified, a true is returned as indicated in block 410. Otherwise, when a match is not identified, checking for more parts in the lassoable parts list 136 is performed as indicated in a decision block 412. When more parts are identified, the sequential operations return to block 404. Otherwise, a false is returned as indicated in block 414.

Figure 5:
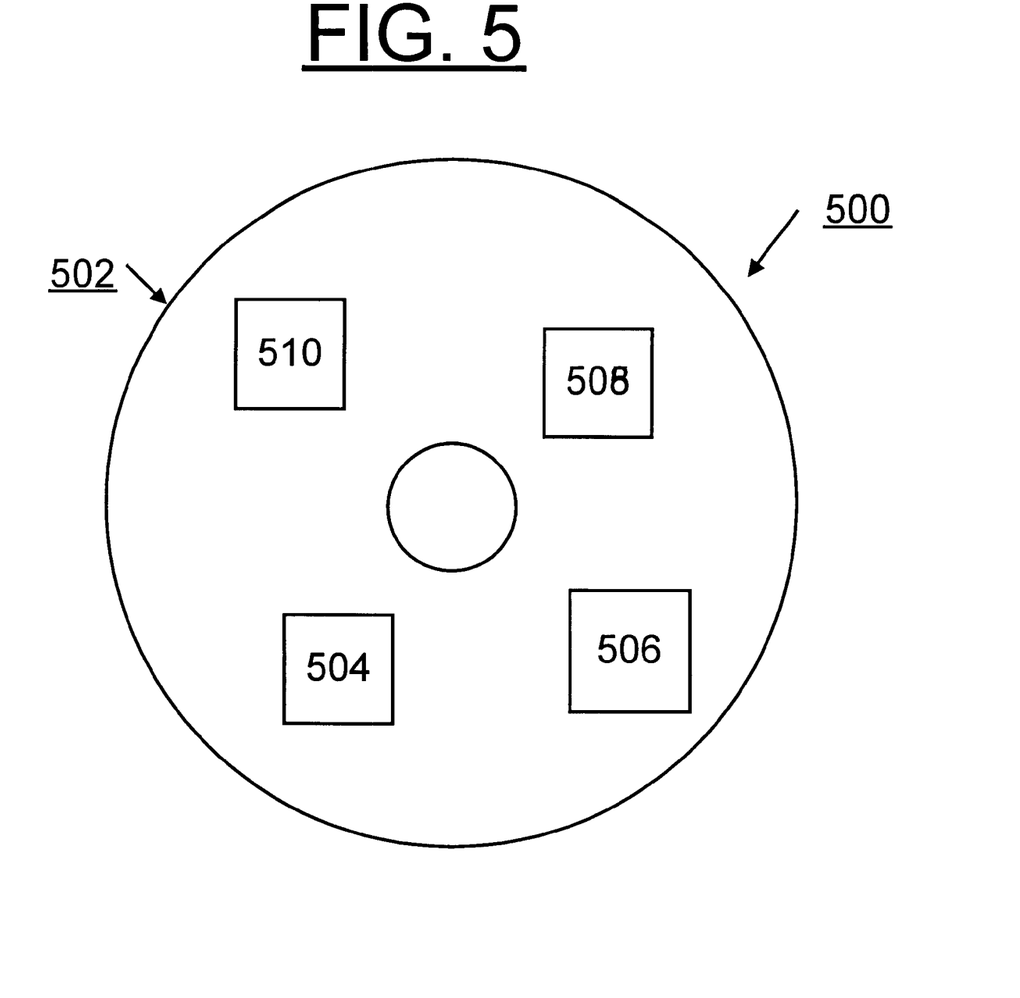
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing graphical user interface (GUI) window control of the preferred embodiment in the system 100 of FIGS. 1A and 1B.

A sequence of program instructions or a logical assembly of one or more interrelated modules defined by the recorded program means 504, 506, 508, 510, direct the computer system 100 for implementing graphical user interface (GUI) window control of the preferred embodiment.

While the present invention has been described with reference to the details of the embodiments of the invention shown in the drawing, these details are not intended to limit the scope of the invention as claimed in the appended claims.

What is claimed is:

1. A computer implemented method for implementing graphical user interface (GUI) window control comprising the steps of:

defining at least one window portion of a window object for selection by storing a lassoable parts data list, said lassoable parts data list including at least one window border portion; and storing a location queue of locations of pointer device movement;

checking for a predefined path selection of one said window portion;

responsive to identifying said predefined path selection, identifying a user selection entry within a set time period; and enabling dragging of said selected window portion responsive to said user selection entry for resizing said window object.

2. A computer implemented method for implementing graphical user interface (GUI) window control as recited in claim 1 wherein the step of checking for a predefined path selection of one said window portion includes the steps of identifying said at least one window portion being crossed and identifying an order of said at least one window portion being crossed.

3. A computer implemented method for implementing graphical user interface (GUI) window control as recited in claim 1 wherein the step of checking for a predefined path selection of one said window portion includes the steps of responsive to identifying said selection, highlighting said selected window portion.

4. A computer implemented method for implementing graphical user interface (GUI) window control as recited in claim 1 wherein the step of enabling dragging of said selected window portion responsive to said user selection entry includes the step of dragging said selected portion to a new mouse position and resizing said window object.

5. A computer system having apparatus for implementing graphical user interface (GUI) window control comprising:
- a processor,
- a memory;
- a display;
- a bus connecting said processor, said memory and said display,
- a GUI window control program, a lassoable parts data list defining at least one window portion of a window object for selection; said lassoable parts data list including at least one window border portion; and a location queue of locations of pointer device movement, said GUI window control program performing the steps of:
  - checking for a path selection of one said window portion;
  - responsive to identifying said selection, identifying a user selection entry within a set time period; and
  - enabling dragging of said selected window portion responsive to said user selection entry for resizing said window object.

6. A computer program product for implementing graphical user interface (GUI) window control, said computer program product including a plurality of computer executable instructions stored on a computer readable medium, wherein said instructions, when executed by said computer, cause the computer to perform the steps of:
- defining predefined window portions of a window object for selection by storing a lassoable parts data list, said lassoable parts data list including at least one window border portion; and storing a location queue of locations of pointer device movement;
- checking for a selection of one said window portion;
- responsive to identifying said selection, identifying a user selection entry within a set time period; and
- enabling dragging of said selected window portion responsive to said user selection entry for resizing said window object.

7. A computer program product for implementing graphical user interface (GUI) window control as recited in claim 6 further includes the step of identifying one said window portion being crossed and identifying an order of one said window portion being crossed by said mouse or other pointer device.

8. A computer program product for implementing graphical user interface (GUI) window control as recited in claim 6 further includes the step of identifying said selection of one said window portion and highlighting said window portion.

\* \* \* \* \*